United States Patent
Inagaki et al.

(10) Patent No.: US 11,698,048 B2
(45) Date of Patent: Jul. 11, 2023

(54) UTILITY VEHICLE

(71) Applicant: KAWASAKI JUKOGYO KABUSHIKI KAISHA, Hyogo (JP)

(72) Inventors: Yoshihiko Inagaki, Akashi (JP); Hiroshi Nakatani, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 119 days.

(21) Appl. No.: 17/232,834

(22) Filed: Apr. 16, 2021

(65) Prior Publication Data

US 2022/0333564 A1    Oct. 20, 2022

(51) Int. Cl.
 *F02M 35/10*   (2006.01)
 *B60K 13/02*   (2006.01)
 *B01D 45/06*   (2006.01)
 *F02M 35/08*   (2006.01)

(52) U.S. Cl.
 CPC ....... *F02M 35/10144* (2013.01); *B01D 45/06* (2013.01); *B60K 13/02* (2013.01); *F02M 35/084* (2013.01); *F02M 35/10314* (2013.01)

(58) Field of Classification Search
 CPC ........... F02M 35/10144; F02M 35/162; F02M 35/084; F02M 35/10314; F02M 35/0201; B01D 45/06; B60K 13/02; F16H 57/0416; F16H 57/027; F16H 57/0489
 See application file for complete search history.

(56) References Cited

U.S. PATENT DOCUMENTS

| 2012/0097463 | A1* | 4/2012 | Iwata | B60K 1/00 |
| | | | | 180/65.1 |
| 2017/0284346 | A1* | 10/2017 | Kontani | F02M 35/048 |
| 2019/0383248 | A1 | 12/2019 | Bouchard et al. | |

FOREIGN PATENT DOCUMENTS

| JP | 2001280204 | * 10/2001 |
| JP | 2019131044 | * 8/2019 |
| VN | 10014869 | * 1/2016 |

* cited by examiner

*Primary Examiner* — Syed O Hasan
(74) *Attorney, Agent, or Firm* — Wenderoth Lind & Ponack, L.L.P.

(57) ABSTRACT

The utility vehicle includes a body; a frame that supports the body; an on-board device that is mounted on the frame and requires outside air; and an air intake conduit that is connected to the on-board device. An air intake port of the air intake conduit that sucks in outside air faces a center side of the utility vehicle.

17 Claims, 6 Drawing Sheets

Back ⟵⎯⎯⟶ Front

Fig. 1

Back ⟵⟶ Front

Fig. 2

Back ⟵⟶ Front

Front ←——→ Back

UTILITY VEHICLE

BACKGROUND OF THE INVENTION

1. Technical Field

The present invention relates to a utility vehicle.

2. Description of Related Art

For example, the utility vehicle described in US Patent Publication No. 2019/0383248 includes an air intake system for supplying air to an engine. The air intake system includes an air intake port that sucks in outside air, and a honeycomb grill is attached to the air intake port.

However, in the case of the utility vehicle described in the above publication, the air intake port is provided on a side surface of a body of the utility vehicle and faces an outside of the utility vehicle. Therefore, foreign substances such as water and mud easily enter the air intake port. In addition, when mud accumulates on the honeycomb grill and dries, the dried mud may block the air intake port.

SUMMARY

In view of the problems, an object of the present invention is to keep foreign substances such as mud and water from entering an air intake port for sucking in outside air provided in a device for driving an engine or cooling various devices.

In order to attain the above object, one aspect of the present invention provides a utility vehicle including a body; a frame that supports the body; an on-board device that is mounted on the frame and requires outside air; and an air intake conduit that is connected to the on-board device, wherein an air intake port of the air intake conduit that sucks in outside air faces a center side of the utility vehicle.

According to such an aspect, it is possible to keep foreign substances such as mud and water from entering the air intake port that sucks in outside air.

DETAILED DESCRIPTION

An embodiment of the present invention will be described below with reference to FIGS. 1 to 11. FIGS. 1 to 11 illustrate a utility vehicle according to an embodiment.

More detailed description than necessary may be omitted. In the drawings, parts not related to the invention may be omitted for simplification. For example, detailed description of already well-known matters and duplicate description of substantially identical configurations may be omitted. This is to avoid unnecessary redundancy of the following description and to facilitate understanding of those skilled in the art.

The inventors provide the accompanying drawings and the following description so that those skilled in the art fully understand the present disclosure and do not intend the subject matter described in the claims to be limited by the accompanying drawings and the following description.

In addition, the terms "front," "rear," "left," and "right" as used herein are front, rear, left, and right sides for a driver of the utility vehicle, respectively.

Figure 1:
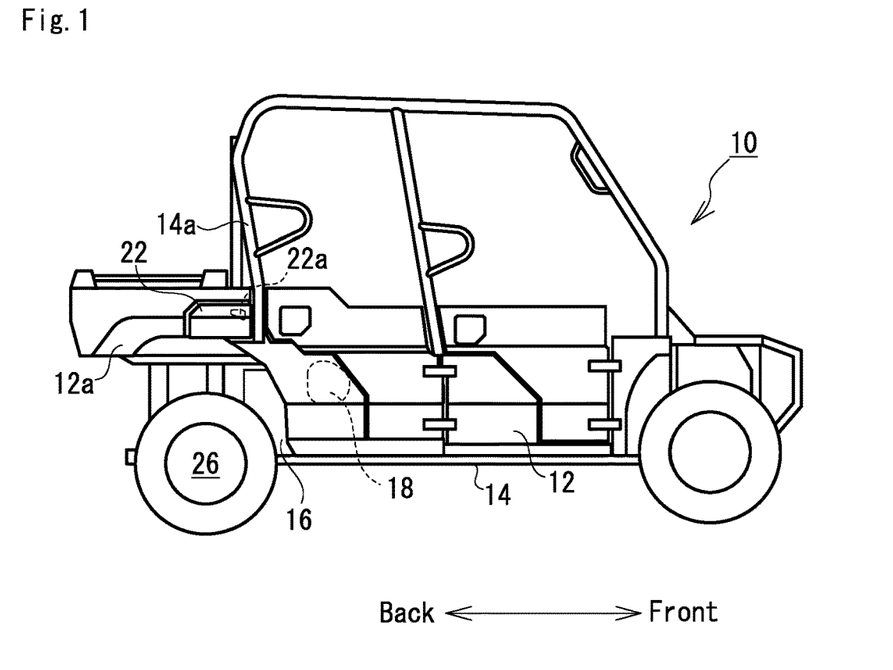
FIG. 1 is a right side view of a utility vehicle according to an embodiment of the present invention.

FIG. 1 is a right side view of a utility vehicle 10 according to the embodiment.

As illustrated in FIG. 1, the utility vehicle 10 includes a body 12, a frame 14 that supports the body 12, an engine 16, which is an on-board device that is mounted on the frame 14 and requires outside air, and an air cleaner 18 that is connected to the engine 16 and removes foreign substances such as particles from the outside air taken into the engine 16. The engine 16 requires outside air because outside air is needed for driving of the engine 16.

Figure 2:
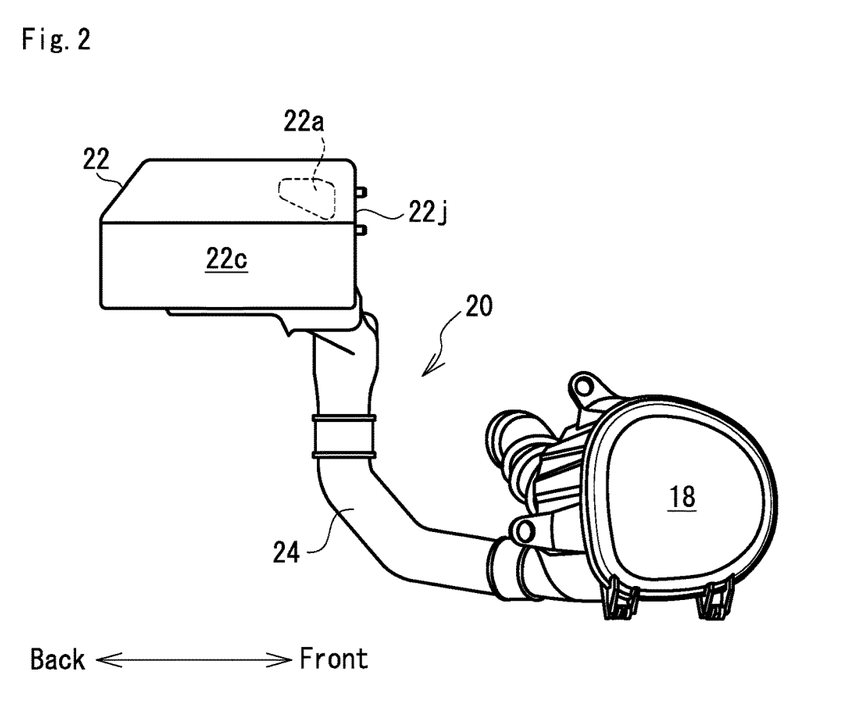
FIG. 2 is a perspective view of an air intake conduit for introducing outside air into an air cleaner.
Figure 3:
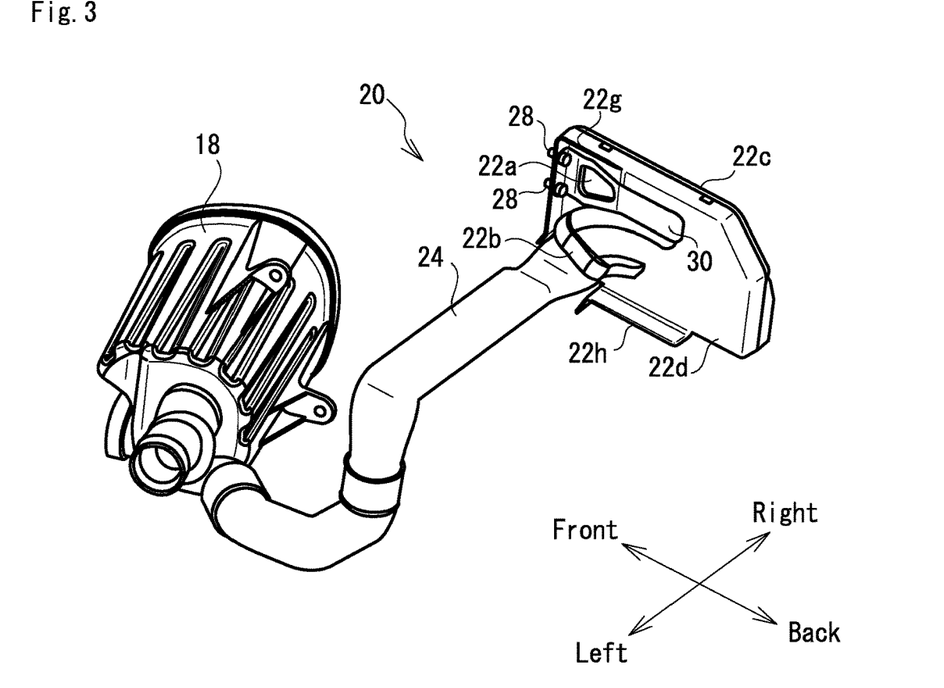
FIG. 3 is a perspective view of the air intake conduit for introducing outside air into the air cleaner, viewed from a different viewpoint from FIG. 2.

FIGS. 2 and 3 are perspective views of an air intake conduit for introducing outside air into the air cleaner, as viewed from different viewpoints.

As illustrated in FIGS. 2 and 3, the utility vehicle 10 has an air intake conduit 20 for introducing outside air into the air cleaner 18. In the present embodiment, the air intake conduit 20 includes a chamber body 22 for taking in outside air and a connecting pipe 24 for connecting the chamber body 22 and the air cleaner 18.

As illustrated in FIGS. 2 and 3, the chamber body 22 constitutes one end of the air intake conduit 20. In the present embodiment, the chamber body 22 is made of a resin material and has a substantially rectangular parallelepiped shape, and includes an internal flow path, which will be described in detail later. Further, the chamber body 22 includes an air intake port 22a for sucking outside air into the internal flow path thereof and a connecting portion 22b for connecting the connecting pipe 24 and the chamber body 22.

Figure 4:
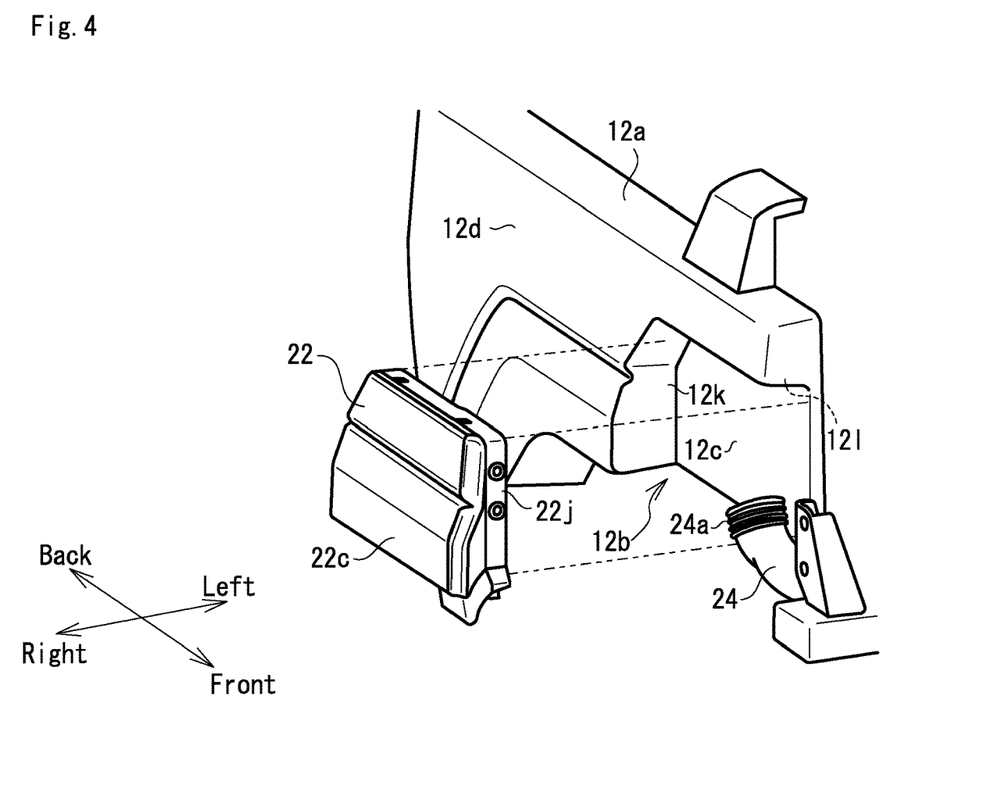
FIG. 4 is a perspective view of a part of the utility vehicle and illustrates a state where a chamber body of the air intake conduit has been removed.

FIG. 4 is a perspective view of a part of the utility vehicle illustrating a state in which the chamber body of the air intake conduit has been removed.

In the present embodiment, a front side portion 22j of the chamber body 22 of the air intake conduit 20 is fixed to the frame, and thereby the chamber body 22 of the air intake conduit 20 is provided on a right side surface of the body 12 of the utility vehicle 10, as illustrated in FIGS. 1 and 4. This will be described in detail later. Specifically, in the present embodiment, the utility vehicle 10 includes a carrier. The chamber body 22 is disposed in a recess 12b formed in a carrier side cover 12a forming a right side surface of the carrier and located above a right rear wheel 26. The recess 12b is formed in the carrier side cover 12a so that front and bottom sides thereof in the utility vehicle 10 are opened.

The air intake port 22a of the chamber body 22 does not face an outward direction of the utility vehicle 10, as illustrated in FIGS. 1 and 2. That is, the air intake port 22a is not on an outer side surface 22c of the chamber body 22. In the present specification, the utility vehicle 10 has a center (that is, a center in the front-rear direction, a left-right direction, and an up-down direction), and a direction toward the center is referred to as an "inward direction", and a direction away from the center is referred to as an "outward direction". Specifically, as illustrated in FIGS. 3 and 4, the recess 12b of the carrier side cover 12a is defined, and the air intake port 22a is formed in an inner side surface 22d of the chamber body 22 that is opposite to a surface 12c facing a rightward direction (outward direction). In other words, the air intake port 22a is opened toward the inward direction in a vehicle width direction of the utility vehicle.

Figure 5:
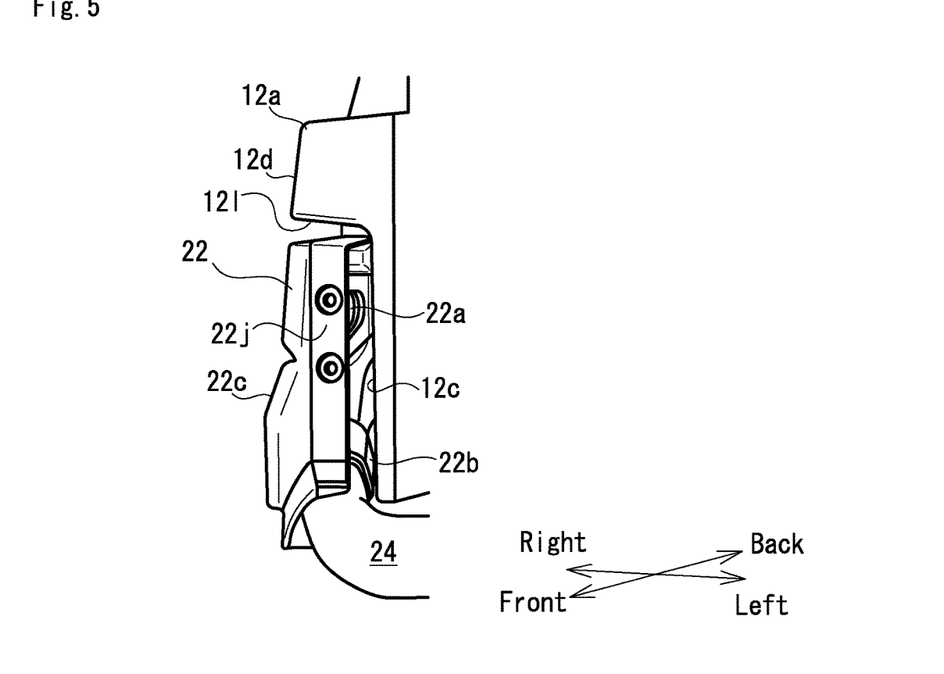
FIG. 5 illustrates a state in which the chamber body of the air intake conduit has been disposed in a recess of the body and is a perspective view of a part of the utility vehicle viewed from a front side.

FIG. 5 illustrates a state in which the chamber body of the air intake conduit is disposed in the recess of the body and is a perspective view of a part of the utility vehicle viewed from the front side.

As illustrated in FIG. 5, the air intake port 22a is opened at least in the vehicle width direction (left-right direction) of the utility vehicle 10 and faces the center side (inward direction) in the vehicle width direction. In the present embodiment, the chamber body 22 is disposed on the right side surface of the body 12, and therefore the air intake port 22a faces at least the leftward direction. This can keep foreign substances such as mud and water from entering the air intake port 22a as compared with a case where the air intake port 22a faces the outward direction (rightward direction) of the utility vehicle 10.

Further, as illustrated in FIG. 5, the air intake port 22a of the chamber body 22 faces the surface 12c of the recess 12b of the carrier side cover 12a so that a gap is formed therebetween. In the present embodiment, the entire chamber body 22 is disposed in the recess 12b so that a gap is formed not only with the surface 12c but also with a surface 12k facing a frontward direction and a surface 12l facing a downward direction that define the recess 12b. This allows the air intake port 22a to suck in outside air that has entered the recess 12b from the front side while the utility vehicle 10 is traveling without being blocked by the carrier side cover 12a. The chamber body 22 is disposed in the recess 12b so as not to protrude from a side surface of the body 12, that is, a side surface 12d of the carrier side cover 12a in the front view or the rear view of the utility vehicle 10. This protects the chamber body 22 and does not impair design of the side surface of the body 12.

In the present embodiment, the air intake port 22a faces forward while facing leftward as described above so that air intake efficiency of the air intake port 22a improves, as illustrated in FIG. 5.

Figure 6:
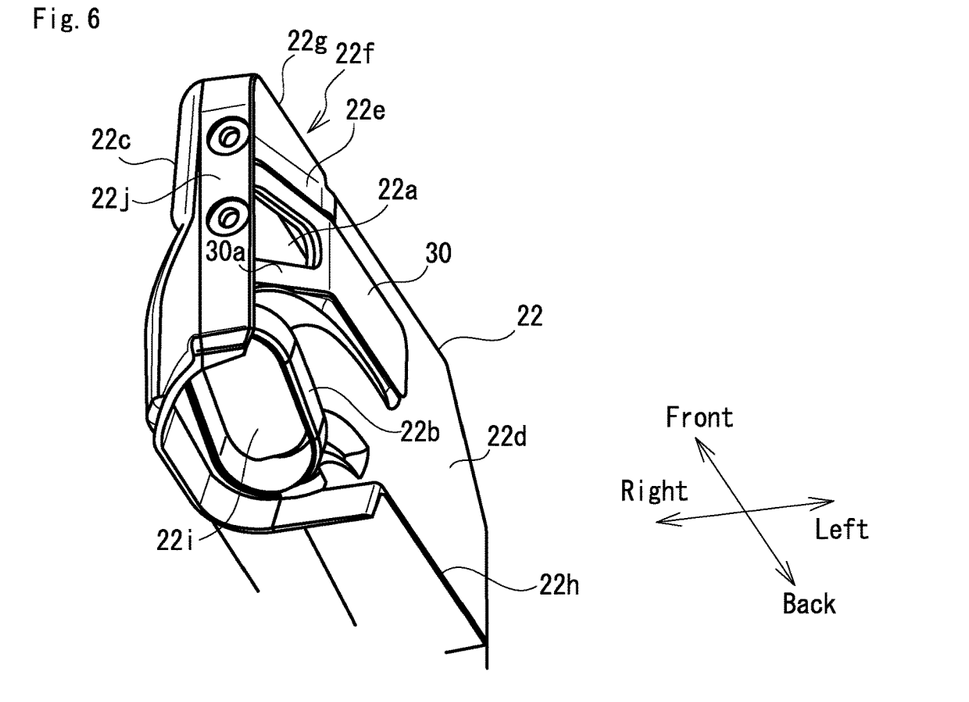
FIG. 6 is a perspective view of the chamber body viewed from below and inside the vehicle body.

FIG. 6 is a perspective view of the chamber body as viewed from below and inside the vehicle body.

As illustrated in FIG. 6, an inner side surface 22d of the chamber body 22 has a recess 22f having a slope surface 22e. The slope surface 22e is an inclined surface that is inclined outward (rightward) in the vehicle width direction from the rear side to the front side of the utility vehicle 10. The air intake port 22a is formed in such a slope surface 22e, and therefore the air intake port 22a faces leftward and forward. This allows the air intake port 22a to suck in a large amount of outside air while the utility vehicle 10 is travelling as compared with a case where the air intake port 22a faces only leftward.

The utility vehicle 10 according to the present embodiment has a plurality of features for keeping foreign substances from entering the air intake port 22a.

First, as illustrated in FIG. 6, the chamber body 22 includes an eaves portion 22g in order to keep foreign substances from entering the air intake port 22a from above. The eaves portion 22g is provided above the air intake port 22a and projects toward the center in the vehicle width direction (leftward). By covering the air intake port 22a with the eaves portion 22g, foreign substances are kept from entering the air intake port 22a from above. The eaves portion 22g and the front side portion 22j are continuous with each other, and thereby foreign substances are also kept from entering the air intake port 22a from the front side.

Further, the chamber body 22 includes a mudguard portion 22h in order to keep foreign substances from entering the air intake port 22a from below. A shape and mounting features of the mudguard portion 22h will be described later.

Figure 7:
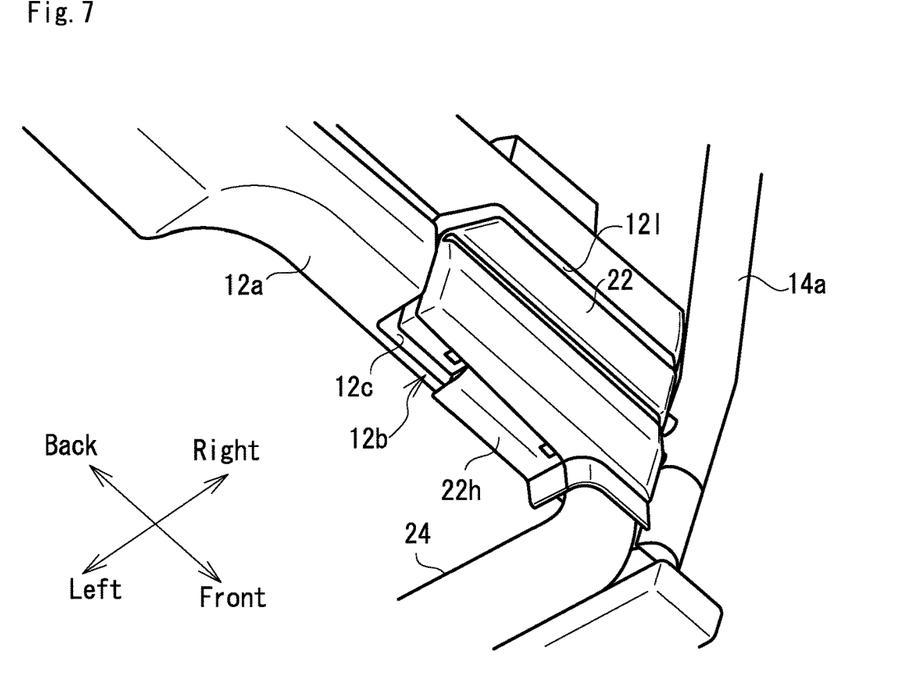
FIG. 7 illustrates a state in which the chamber body of the air intake conduit has been disposed in the recess of the body and is a perspective view of a part of the utility vehicle viewed from below.

FIG. 7 illustrates a state in which the chamber body of the air intake conduit is disposed in the recess of the body and is a perspective view of a part of the utility vehicle viewed from below.

As illustrated in FIG. 7, there is a gap between the chamber body 22 and the surface 12c of the recess 12b of the carrier side cover 12a. Through this gap, mud from the ground may enter the air intake port 22a facing the surface 12c while the utility vehicle 10 is traveling.

In order to keep mud from the ground from entering the air intake port 22a, the plate-shaped mudguard portion 22h projects from a lower end of the chamber body 22 toward side surface of the body 12, that is, the carrier side cover 12a so as to cover the gap between the chamber body 22 and the surface 12c of the recess 12b of the carrier side cover 12a.

The mudguard portion may protrude not from the chamber body 22 but from the side surface of the body.

Such intrusion of mud from the ground into the air intake port 22a can occur when the wheels kick up the mud on the ground. In view of this, as illustrated in FIG. 1, the air intake port 22a is preferably provided on an upper portion of the chamber body 22 far from the ground in the side view of the body 12, and as for a positional relationship between the wheel and the air intake port 22a, the air intake port 22a is preferably disposed ahead of the wheel, considering the fact that mud is easily kicked up from the wheel from the front side toward the rear side of the vehicle body when the utility vehicle 10 is travelling forward. That is, the air intake port 22a is preferably located at least above (above and/or ahead of) the wheel (right rear wheel 26).

As described above, the chamber body 22 is disposed on the side surface of the body 12, that is, in the recess 12b of the carrier side cover 12a with a gap interposed therebetween so that the air intake port 22a can take in air while keeping foreign substances from entering the air intake port 22a. Therefore, the chamber body 22 is not supported by the carrier side cover 12a.

Figure 8:
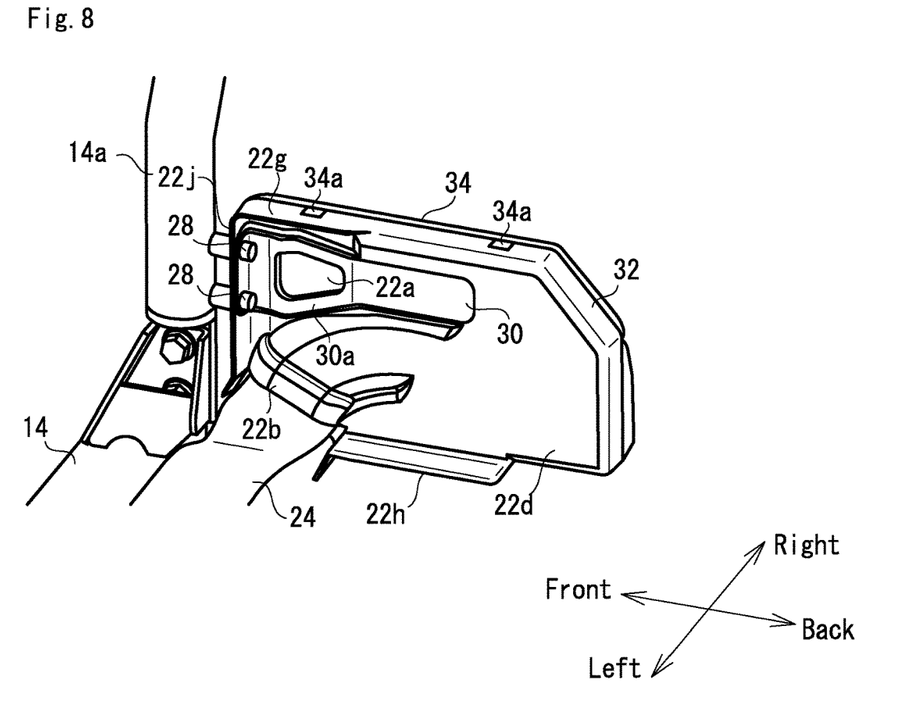
FIG. 8 is a perspective view of a part of the utility vehicle viewed from an inner side of the vehicle body and illustrates a state where the chamber body of the air intake conduit has been attached to the frame.

FIG. 8 is a perspective view of a part of the utility vehicle viewed from an inner side of the vehicle body and illustrates a state in which the chamber body of the air intake conduit has been attached to the frame.

As illustrated in FIG. 8, in the present embodiment, the chamber body 22 is fixed to the frame 14, specifically, a rear side pipe frame 14a included in a ROPS which is a part of the frame 14. Specifically, the chamber body 22 is fixed to the rear side pipe frame 14a at the front side portion 22j with use of a plurality of screws 28 and a bracket 30.

In the present embodiment, the bracket 30 is made of a metal material and is integrally incorporated into the chamber body 22. For example, the chamber body 22 and the bracket 30 are insert-molded. The bracket 30 partially improves the rigidity of the chamber body 22 made of the resin material. As a result, breakage of the chamber body 22 made of the resin material, particularly breakage of a portion fixed to the rear side pipe frame 14a with the use of the screws 28 is suppressed.

Further, in the present embodiment, the bracket 30 includes a ring portion 30a that supports and reinforces an edge portion of the air intake port 22a. Specifically, the bracket 30 is integrally incorporated into the chamber body 22 so that the ring portion 30a thereof overlaps the edge portion of the air intake port 22a. The ring portion 30a improves the rigidity of the edge portion of the air intake port 22a and suppresses abrasion of the edge portion of the air intake port 22a caused by sucked sand or stones.

An internal flow path of the chamber body 22 will be described below.

Figure 9:
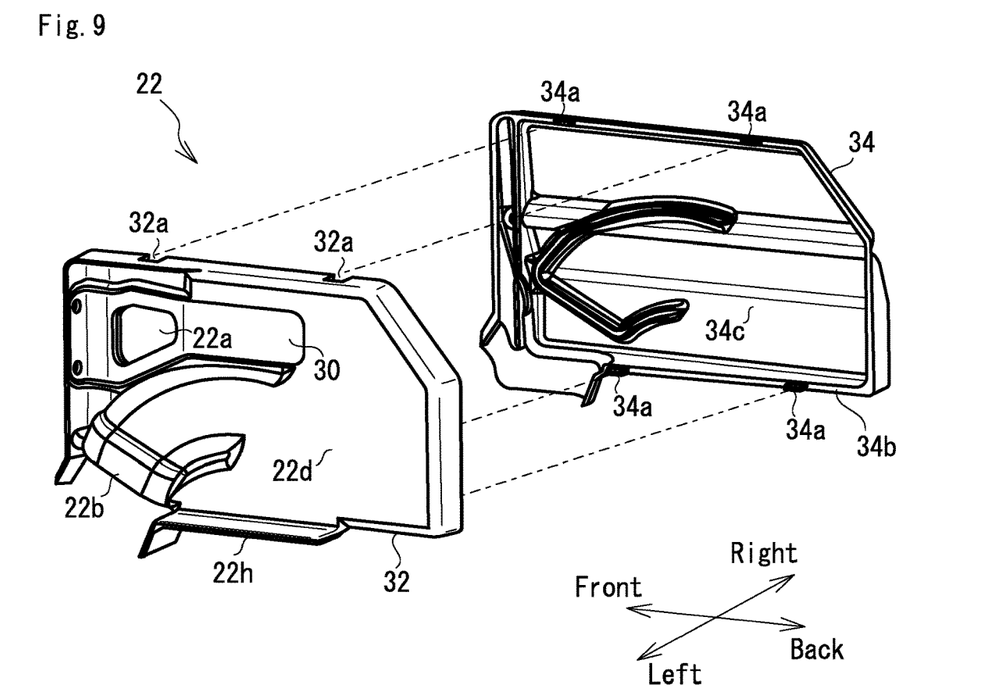
FIG. 9 is an exploded perspective view of the chamber body.
Figure 10:
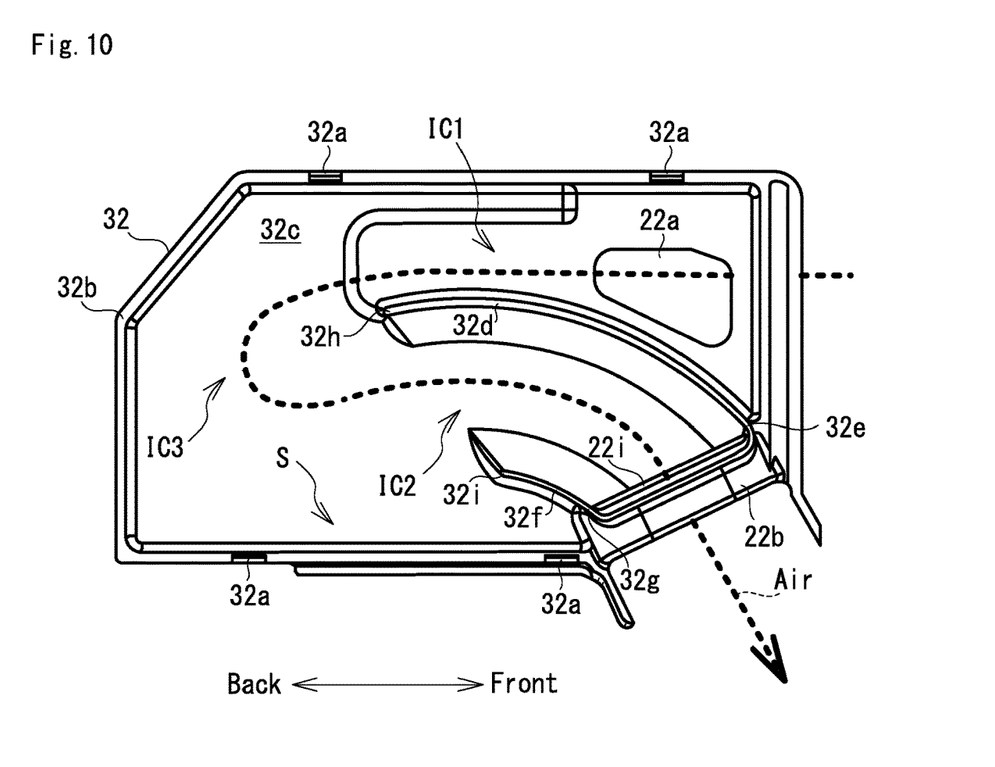
FIG. 10 illustrates an inner side of a first member of the chamber body.
Figure 11:
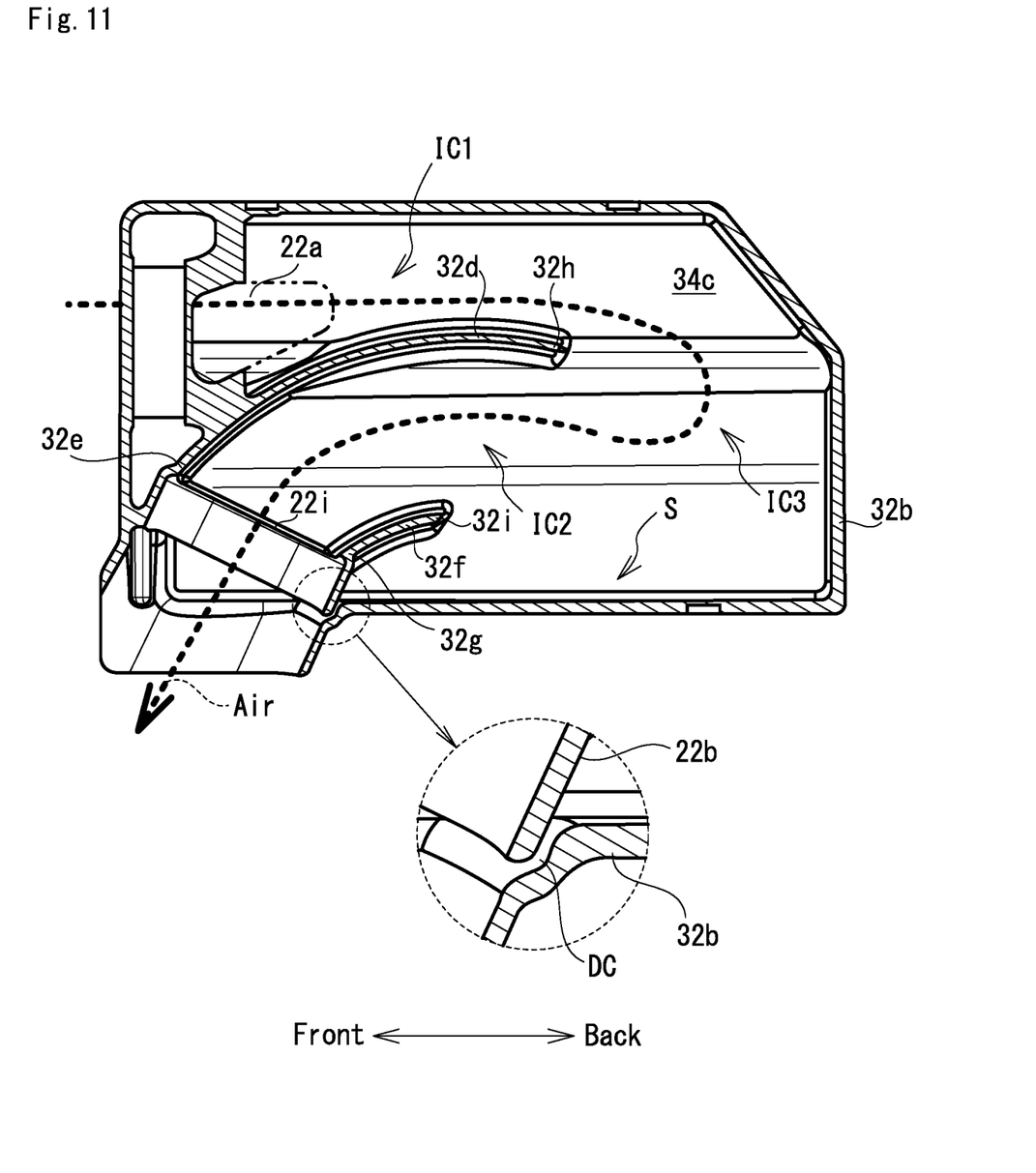
FIG. 11 is a cross-sectional view of the chamber body.

FIG. 9 is an exploded perspective view of the chamber body 22. FIG. 10 is a view of a first member 32 of the chamber body 22, which will be described later, as viewed from an inner side in the vehicle body direction. FIG. 11 is a cross-sectional view of the chamber body 22 taken along a plane that is parallel to the vehicle body front-rear direction and the vehicle body up-down direction and passing the center of the chamber body 22 in the vehicle width direction, which view is viewed from an inner side in the vehicle width direction. In FIG. 11, only a cross section of the first member 32 is illustrated.

As illustrated in FIG. 9, in present embodiment, the chamber body 22 has the first member 32 disposed on a center side (left side) in the vehicle width direction and a second member 34 that is detachably attached on an outer side (right side) of the first member 32 in the vehicle width direction.

In the present embodiment, the first member 32 is fixed to the frame 14, specifically, the rear side pipe frame 14a with the use of the bracket 30. A portion of the first member 32 fixed to the rear side pipe frame 14a is the front side portion 22j of the chamber body 22. The second member 34 is detachably attached to such a first member 32. The second member 34 includes, for example, a plurality of engaging claws 34a. The second member 34 is detachably attached to the first member 32 by engaging the plurality of engaging claws 34a with corresponding engaging portions 32a of the first member 32. Since the second member 34 is detachable from the first member 32, an inside of the chamber body 22 can be accessed without unfastening the screws 28 and removing the entire chamber body 22 from the rear side pipe frame 14a. This makes it possible to remove foreign substances that have infiltrated and accumulated in the chamber body 22 through the air intake port 22a.

In the present embodiment, the first member 32 is provided with the connecting portion 22b of the chamber body 22. As illustrated in FIG. 6, the connecting portion 22b has an annular shape, and one end 24a of the connecting pipe 24 illustrated in FIG. 4 is inserted into the connecting portion 22b. By inserting the one end 24a of the connecting pipe 24 into the connecting portion 22b, a connecting port 22i of the chamber body 22 that is formed in the first member 32 and is communicates with the internal flow path of the chamber body 22 is also communicates with the air cleaner 18 via the connecting pipe 24.

Through cooperation between the first member 32 and the second member 34 attached to the first member 32, specifically, through engagement between a frame-shaped outer wall portion 32b of the first member 32 that protrudes toward the second member 34 and a frame-shaped protruding portion 34b of the second member 34 that protrudes toward the first member 32, the internal flow path of the chamber body 22, which is a space, is formed between the first member 32 and the second member 34.

As illustrated in FIGS. 10 and 11, in the present embodiment, the internal flow path of the chamber body 22 includes an upstream side flow path 101, a downstream side flow path IC2, and a turn-around flow path IC3 that connects the upstream side flow path IC1 and the downstream side flow path IC2.

Specifically, in the present embodiment, the air intake port 22a and the connecting port 22i are substantially arranged in the up-down direction, as illustrated in FIG. 10. A first guide wall 32d erected toward the second member 34 is provided on an inner side surface 32c of the first member 32 so as to be located between the air intake port 22a and the connecting port 22i. A top of the first guide wall 32d makes contact with an inner side surface 34c of the second member 34. A proximal end 32e (an end closer to the air intake port 22a) of the first guide wall 32d is located at an upper end of the connecting port 22i. The first guide wall 32d extends in an arc shape upward and backward from the upper end of the connecting port 22i. The upstream side flow path IC1 is formed above the first guide wall 32d.

Further, below the first guide wall 32d, a second guide wall 32f is provided that is erected toward the second member 34 and makes contact with the inner side surface 34b of the second member 34. A proximal end 32g (an end closer to the connecting port 22i) of the second guide wall 32f is located at a lower end of the connecting port 22i. The second guide wall 32f extends upward and backward from the lower end of the connecting port 22i. The downstream side flow path IC2 is formed between the second guide wall 32f and the first guide wall 32d.

Accordingly, the upstream side flow path IC1 and the downstream side flow path IC2 extend from the air intake port 22a and the connecting port 22i, respectively, in substantially the same direction with the first guide wall 32d interposed therebetween. That is, the downstream side flow path IC2 extends at least in the direction in which the upstream side flow path IC1 extends.

As illustrated in FIGS. 10 and 11, the first guide wall 32d does not extend to the frame-shaped outer wall portion 32b of the first member 32. That is, a distal end 32h (an end farther from the air intake port 22a) of the first guide wall 32d is separated from the frame-shaped outer wall portion 32b. This forms the turn-around flow path IC3 that connects a distal end (an end farther from the air intake port 22a) of the upstream side flow path IC1 and a distal end (an end farther from the connecting port 22i) of the downstream side flow path IC2.

Through such an internal flow path, that is, the upstream side flow path IC1, the downstream side flow path IC2, and the turn-around flow path IC3, outside air flowing into the air intake port 22a flows backward, turns around at the distal end 32h of the first guide wall 32d, and then flows forward toward the connecting port 22i, as indicated by the thick dashed arrow in FIGS. 10 and 11. Then, the outside air that has turned around flows out from the connecting port 22i and flows into the connecting pipe 24 connected to the connecting portion 22b.

By such an internal flow path through which the outside air turns around, foreign substances contained in the outside air are separated from the outside air. A dust catching space S in which the separated foreign substances are temporarily stored is provided in the chamber body 22.

In the present embodiment, the dust catching space S is provided below the downstream side flow path IC2 and the turn-around flow path IC3. That is, the dust catching space S is located above a lowest portion of the frame-shaped wall portion 32*b* of the first member 32 and a lowest portion of the frame-shaped wall portion 34*b* of the second member 34 engaged with the first member 32.

When the outside air turns substantially by 180 degrees in the turn-around flow path IC3, foreign substances accompanying the outside air are separated from the outside air by centrifugal force and gravity. The separated foreign substances fall into the dust catching space S below the turn-around flow path IC3. Further, the outside air flowing through the downstream side flow path IC2 flows at a lower flow velocity than a flow velocity in the upstream side flow path IC1 due to the turn at the turn-around flow path IC3. As a result, the foreign substances accompanying the outside air fall into the dust catching space S below downstream side flow path IC2 due to gravity. The foreign substances accumulated in the dust catching space S can be removed by removing the second member 34 from the first member 32.

According to such a chamber body 22, foreign substances can be removed from the outside air without gradually reducing air intake efficiency, unlike a filter that is clogged with foreign substances. That is, no filter is needed for the air intake conduit 20 due to the chamber body 22. Note that the chamber body 22 and a filter may be used in combination.

In order to improve efficiency of removing foreign substances by the chamber body 22, a flow path cross-sectional area of the internal flow path (the upstream side flow path IC1, the downstream side flow path IC2, and the turn-around flow path IC3) is preferably larger than opening areas of the air intake port 22*a* and the connecting port 22*i*. Accordingly, the flow velocity of the outside air flowing into the chamber body 22 decreases in the chamber body 22, and foreign substances accompanying the outside air can be easily separated from the outside air in the chamber body 22. As a result, foreign substances are less likely to pass through the connecting port 22*i* and to enter the connecting pipe 24, that is, the air cleaner 18.

In order to keep foreign substances from entering the connecting pipe 24, that is, the air cleaner 18, a distal end of the downstream side flow path IC3 (a portion between the distal end 32*h* of the first guide wall 32*d* and a distal end 32*i* of the second guide wall 32*0*) is preferably located above the dust catching space S, as illustrated in FIGS. 10 and 11. As a result, foreign substances once stored in the dust catching space S are less likely to flow into the downstream side flow path IC3, thereby keeping foreign substances from entering the air cleaner 18 via the connecting pipe 24.

Further, the chamber body 22 preferably includes a drainage flow path DC for draining water stored in the dust catching space S. The drainage flow path DC is opened at a lower part of the chamber body 22. As illustrated in FIG. 11, the drainage flow path DC communicates with the outside of the chamber body 22 and the dust catching space S and is constituted by a gap between the connecting portion 22*b* and the frame-shaped outer wall portion 32*b*. The drainage flow path DC keeps water from accumulating in the chamber body 22.

According to the present embodiment described above, it is possible to keep foreign substances such as mud and water from entering the air intake port that sucks in outside air for driving the engine.

Although the present invention has been described above with reference to the above embodiment, the embodiment of the present invention is not limited to this.

For example, in the above embodiment, an engine that requires outside air for driving has been exemplified as an on-board device that requires outside air, but the embodiment of the present invention is not limited to this. For example, the on-board device may be any of various devices such as a continuously variable transmission that requires outside air for cooling. Further, in a case where the utility vehicle travels by a drive source other than an engine, for example, by a motor, the motor may be cooled by outside air. That is, in the embodiment of the present invention, usage of the outside air does not matter. Therefore, in the embodiment of the present invention, the on-board device is a device that requires outside air.

Further, in the above embodiment, the chamber body of the air intake conduit is provided on a side surface of the body of the utility vehicle, but the embodiment of the present invention is not limited to this. The position of the chamber body may be any position as long as the air intake port of the chamber body can suck in outside air.

Further, in the above embodiment, the air intake port 22*a* is located above the connecting port 22*i* in the chamber body 22, as illustrated in FIG. 10. Therefore, the internal flow path of the chamber body 22 is a flow path in which the outside air (thick dashed line) that has passed through the air intake port 22*a* once flows backward and turns back toward the connecting port 22*i*. However, the embodiment of the present invention is not limited to this. The internal flow path of the chamber body through which the outside air flows may be any internal flow path that allows foreign substances accompanying the outside air to be separated from the outside air. Therefore, the shape and a flow path cross-sectional area of the internal flow path and the positions of the air intake port and the connecting port are not limited. Also, the number of air intake ports is not limited to one. In addition, directions of flow before and after the outside air turns around in the internal flow path are not limited.

Furthermore, in the above embodiment, the air intake conduit includes a chamber body including an air intake port and is connected to an on-board device, that is, an engine via an air cleaner. However, the embodiment of the present invention is not limited to this. The chamber body and the air cleaner can be omitted if the air intake port is provided so as to substantially prevent foreign substances from entering.

That is, the embodiment according to the present invention is, in a broad sense, a utility vehicle that includes a body, a frame that supports the body, an on-board device that is mounted on the frame and requires outside air, and an air intake conduit connected to the on-board device, wherein an air intake port of the air intake conduit that sucks in outside air faces a center side of the utility vehicle. In this case, the center side of the utility vehicle is a direction from an outer side toward an inner side of the utility vehicle and includes not only the vehicle width direction in the above embodiment but also the up-down direction and the front-rear direction of the vehicle body.

As described above, the embodiment has been described as an example of the technique according to the present invention. For this purpose, the accompanying drawings and detailed description are provided. Therefore, the constituent elements described in the attached drawings and the detailed description include not only constituent elements essential for solving the problem but also constituent elements that are not essential for solving the problem in order to exemplify the technique. Therefore, it should not be determined that such constituent elements that are not essential are essential just because such constituent elements are described in the accompanying drawings or detailed description.

Further, since the above embodiment is for exemplifying the technique of the present invention, various changes, replacements, additions, omissions, etc. can be made within the scope of claims or a scope equivalent to the scope of claims.

The invention claimed is:

1. A utility vehicle comprising:
a body;
a frame supporting the body;
an engine mounted on the frame and requiring outside air;
an air cleaner connected to the engine; and
an air intake conduit connected to the air cleaner,
wherein an air intake port of the air intake conduit for sucking in outside air faces a center side of the utility vehicle, and
wherein the air intake conduit includes:
a chamber body having the air intake port, a connecting port communicating with the air cleaner, and an internal flow path communicating with both the air intake port and the connecting port; and
a connecting pipe connecting the connecting port and the air cleaner to allow communication therebetween.

2. The utility vehicle according to claim 1, wherein the air intake port is opened at least in a vehicle width direction of the utility vehicle.

3. The utility vehicle according to claim 1, wherein the internal flow path of the chamber body includes an upstream side flow path extending from the air intake port, a downstream side flow path extending from the connecting port at least in a direction in which the upstream side flow path extends, and a turn-around flow path connecting a distal end of the upstream side flow path farther from the air intake port and a distal end of the downstream side flow path farther from the connecting port.

4. The utility vehicle according to claim 3, wherein the chamber body has, below the turn-around flow path of the internal flow path, a dust catching space for storing foreign substances contained in the outside air.

5. The utility vehicle according to claim 3, wherein:
the upstream side flow path is located above the downstream side flow path in the internal flow path, and
a dust catching space for storing foreign substances contained in the outside air is located below the downstream side flow path.

6. The utility vehicle according to claim 5, wherein the distal end of the downstream side flow path is located above the dust catching space.

7. The utility vehicle according to claim 1, wherein a flow path cross-sectional area of the internal flow path is larger than opening areas of the air intake port and the connecting port.

8. The utility vehicle according to claim 4, wherein the chamber body includes a drainage flow path communicating with the dust catching space and opened at a lower part of the chamber body.

9. The utility vehicle according to claim 1, wherein the chamber body includes a first member and a second member that is detachably attached to the first member and forming the internal flow path together with the first member.

10. The utility vehicle according to claim 2, wherein the air intake port faces a side surface of the body with a gap formed therebetween.

11. The utility vehicle according to claim 1, wherein the chamber body does not protrude from a side surface of the body in front view or rear view of the utility vehicle.

12. The utility vehicle according to claim 1, wherein the chamber body includes a mudguard portion projecting from a lower end of the chamber body toward a side surface of the body and covering a gap between the chamber body and the body.

13. The utility vehicle according to claim 1, wherein the chamber body includes an eaves portion above the air intake port.

14. The utility vehicle according to claim 1, wherein the air intake port is located in an upper portion of the chamber body.

15. The utility vehicle according to claim 1, wherein the chamber body is made of a resin material and includes a metal bracket for attaching the chamber body to the frame.

16. The utility vehicle according to claim 15, wherein the bracket includes a ring-shaped portion supporting and reinforcing an edge portion of the air intake port.

17. The utility vehicle according to claim 1, wherein the air intake port is located above a wheel in side view of the body.

* * * * *

UNITED STATES PATENT AND TRADEMARK OFFICE
CERTIFICATE OF CORRECTION

PATENT NO. : 11,698,048 B2
APPLICATION NO. : 17/232834
DATED : July 11, 2023
INVENTOR(S) : Yoshihiko Inagaki et al.

It is certified that error appears in the above-identified patent and that said Letters Patent is hereby corrected as shown below:

On the Title Page

In item (73) Assignee: replace "KAWASAKI JUKOGYO KABUSHIKI KAISHA, Hyogo (JP)" with -- KAWASAKI MOTORS, LTD., Hyogo (JP) --.

Signed and Sealed this
Twelfth Day of December, 2023

Katherine Kelly Vidal
*Director of the United States Patent and Trademark Office*